United States Patent [19]

Crocker

[11] E Re. 31,155

[45] Reissued Feb. 22, 1983

[54] PUMP DOWN SYSTEM FOR PLACING AND RETRIEVING SUBSURFACE WELL EQUIPMENT

[75] Inventor: Samuel S. Crocker, Houston, Tex.

[73] Assignee: Schlumberger Technology Corporation, New York, N.Y.

[21] Appl. No.: 64,333

[22] Filed: Aug. 6, 1979

Related U.S. Patent Documents

Reissue of:

[64] Patent No.: 3,899,025
Issued: Aug. 12, 1975
Appl. No.: 295,684
Filed: Oct. 6, 1972

U.S. Applications:

[63] Continuation-in-part of Ser. No. 243,380, Apr. 4, 1972, Pat. No. 3,799,259.

[51] Int. Cl.[3] ..... E21B 7/06
[52] U.S. Cl. ..... 166/117.5; 166/156
[58] Field of Search ..... 166/117.5, 153, 156

[56] References Cited

U.S. PATENT DOCUMENTS

| | | | |
|---|---|---|---|
| 2,679,904 | 6/1954 | Howard et al. | 166/117.5 |
| 3,268,006 | 8/1966 | Hayes | 166/117.5 |
| 3,378,080 | 4/1968 | Fredd | 166/156 |
| 3,446,281 | 5/1969 | Watkins | 166/214 |
| 3,507,329 | 4/1970 | Stone, Jr. | 166/214 |
| 3,713,483 | 1/1973 | Robicheaux | 166/117.5 |
| 3,727,693 | 4/1973 | Tausch et al. | 166/156 |
| 3,732,928 | 5/1973 | Sizer | 166/117.5 |
| 3,771,597 | 11/1973 | McGowen | 166/156 |

*Primary Examiner*—James A. Leppink

[57] ABSTRACT

A pump-down assembly for positioning and retrieving subsurface well equipment in a side pocket mandrel. The assembly is articulated to permit it to move through tubing curves and includes positioning and orienting means. Spring loaded latches in the positioning means mate only with correspondingly configured mandrel recesses so that the assembly can be stopped at the desired subsurface location. Guide surfaces in the orienting means rotate the assembly to the proper position relative to the mandrel side pocket. Placement and retrieval operations of the assembly are controlled by the selective application of hydraulic pressure to the well.

22 Claims, 7 Drawing Figures

PUMP DOWN SYSTEM FOR PLACING AND RETRIEVING SUBSURFACE WELL EQUIPMENT

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of U.S. patent application Ser. No. 243,380 filed Apr. 4, 1972 and entitled SIDE POCKET KICKOVER TOOL, issued on Mar. 26, 1974 as U.S. Pat. No. 3,799,259.

BACKGROUND OF THE INVENTION

1. Field of the Invention

The present invention relates generally to the placement and retrieval of subsurface equipment in a well. In particular, the present invention relates to means for pumping well equipment through a production tubing string to land the equipment in a side pocket mandrel and to means for subsequently retrieving the landed equipment from the side pocket of the mandrel and returning it to the well surface. The disclosed embodiment of the invention is particularly directed to well completion systems in which the pump-down equipment must be movable through curving sections of tubing.

2. Brief Description of the Prior Art

The typical offshore oil and gas well is equipped and worked from an offshore production platform. Such platforms have been expensive and dangerous to operate resulting in the development of well systems which can be operated from a remote platform or land base. These remotely operated well systems usually require the use of through-the-flowline (TFL) or pump-down equipment and techniques. The well known wire line technique is not suitable for use with many remotely operated wells since the well tubing does not extend directly downwardly from the working area and the force of gravity cannot be employed to lower the wire line equipment.

In many remotely operated marine completions, the tubing extends horizontally along the water bottom beween the operating platform or land base and the wellhead. The direction of movement of equipment pumped through the tubing must therefore change at the wellhead from horizontal to substantially vertical. Since TFL, pump-down equipment includes rigid components which cannot move through a right angle turn, it is conventional in remotely operated completions to form a large radius curve in the tubing at the wellhead thereby reducing the amount of bending or articulation required by equipment moving through the tubing flow line.

Typical side pocket placement tools are relatively long and rigid which prevents them from being moved through curved tubing. If a conventional pump-down placement or retrieval tool is modified by providing joints along its length which permit it to flex as it moves through the curves, the flexibility of the assembly may prevent it from operating properly once it reaches the subsurface location.

Because of the expense of pump-down equipment and because of the substantial financial loss which may result from its inoperability, it is desirable to employ running and pulling tools of simple, reliable design. In this regard, it is advantageous to employ a single basic assembly for both placing and retrieving subsurface equipment so that the number of different components required for operating and maintaining a pump-down system can be reduced.

It is also desirable to be able to retrieve the running assembly with the use of pump-down techniques when the equipment carried by the assembly becomes lodged or is otherwise inoperative.

In a typical well installation, several die pocket mandrels may be included at different locations in the production tubing string. The equipment to be landed in the side pockets of each of the mandrels may be different and for this reason as well as others, some means is necessary for ensuring that the subsurface equipment is landed in the proper mandrel. Moreover, appropriate means are required for preventing the running and retrieving assembly from operating until it is properly positioned relative to the mandrel.

SUMMARY OF THE INVENTION

The present invention provides a hydraulically operated system for positioning and retrieving gas lift valves and other subsurface well equipment of the type designed to be landed in a side pocket mandrel in a production tubing string or flow line. The well equipment is carried by an articulated running and retrieving assembly which bends to permit the assembly to move through curved sections of the tubing. Pressure supplied to the tubing from the well surface acts against the top of a drive piston in the assembly to drive the assembly down through the tubing. When the assembly reaches a selected side pocket mandrel, spring loaded cam latches spring radially out of the assembly into recesses in the mandrel to prevent further downward movement and to release a safety lock which prevents premature release of the equipment carried by the assembly. The cam latches have a profile designed to mate and spring into a recess having the same profile in the selected mandrel and to slide past the recesses in all higher mandrels so that the downward movement of the assembly is automatically terminated at the selected mandrel.

As the assembly enters the mandrel, it is rotated by an orienting guide so that the equipment carried by the assembly assumes a predetermined position relative to the mandrel side pocket. After the cams are latched into the mandrel recess, continued application of pressure on the top of the driving piston produces an initial relative movement between components of the assembly to release a lock and initiate the first step in the placement and release of the well equipment. The tubing pressure at the top of the piston is then relieved and the annulus between the tubing and casing is pressurized to provide a pressure force below a drive piston causing the top portion of the assembly to shift upwardly. Pressure is then again applied to the top of the drive piston causing a kickover portion of the assembly to bend or jack-knife which in turn causes the bottom of the well equipment carried by the assembly to swing over the top of the side pocket opening. Continued application of pressure lands and latches the equipment in the side pocket. The applied pressure on the driving pistons is then reversed and increased causing the cam latches to retract as the assembly is moved upwardly. This permits the assembly to release the landed well equipment and return to the well surface. With some modification, the same basic assembly and procedure are employed to retrieve the subsurface equipment landed in the side pocket mandrel.

From the foregoing, it will be appreciated that an object of the present invention is to provide a pump-down assembly which can move through a curved production tubing string to position subsurface well equipment in a mandrel side pocket. It is a related object of the invention to provide such an assembly which is also capable of retrieving equipment positioned in the mandrel side pocket.

Another object of the present invention is to provide a pump-down assembly which can move through curved tubing sections customarily encountered in remotely worked well completions to position and retrieve subsurface well equipment. In particular, an important object of the present invention is to provide such an assembly which is capable of being employed to handle equipment for use with side pocket mandrels.

Still another object of the present invention is to provide an apparatus of the type described which can be positively positioned with respect to a selected mandrel and which cannot be activated until it is properly positioned.

It is also an object of the present invention to provide a retrieving and placement assembly of the type described which includes emergency release means for permitting the assembly to be disengaged from lodged or inoperative equipment whereby the assembly may be returned to the well surface.

The foregoing objects and features as well as others will be better appreciated from the following specification, drawings and the related claims.

DESCRIPTION OF THE ILLUSTRATED EMBODIMENT

Figures 1, 2A, 2B:
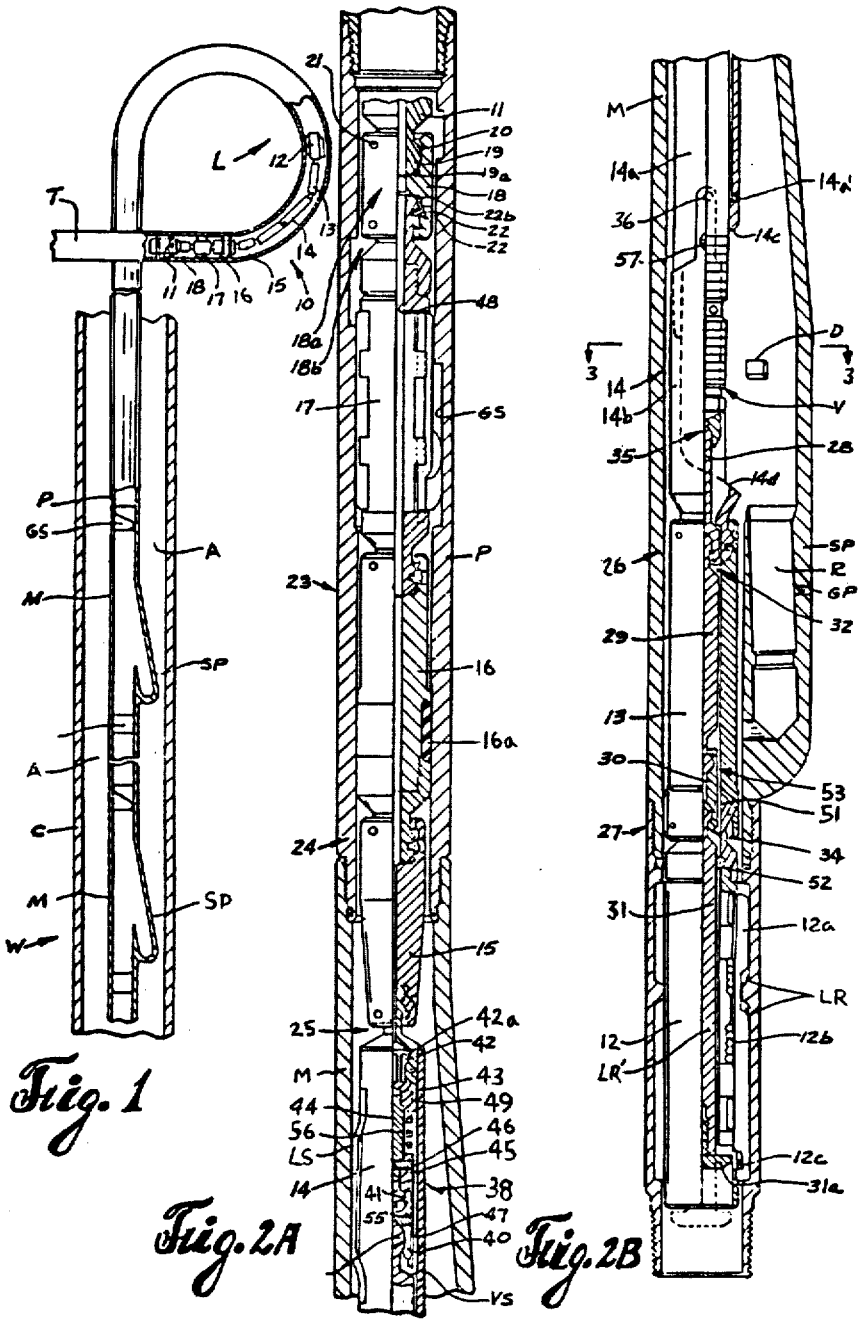
FIG. 1 is a vertical elevation partially in section schematically illustrating a portion of a remotely operated well completion employing side pocket mandrels.
FIGS. 2A and 2B are vertical elevations in quarter section illustrating the upper and lower portions respectively of a preferred form of the running and retrieving assembly of the present invention.

Referring to FIG. 1, a remotely operated well completion system is indicated generally at W. The system W includes a casing C, a production tubing string P and a plurality of side pocket mandrels M with side pockets SP. The suspended production string P and casing C may be supported from the ocean floor by conventional "mud-line" hangers (not illustrated) or may be mounted on an offshore platform (not illustrated). A horizontal section of tubing T connects with a remote surface operating point (not illustrated) and a curved tubing section indicated generally at L is employed to connect the horizontal and vertical tubing sections.

A preferred form of the flexible or articulated running and retrieving assembly of the present invention is indicated generally at 10 as it appears when moving through the curved tubing section L. The assembly 10 includes a primary drive section 11, a cam latch section 12, a lock sleeve section 13, an equipment holding or kickover section 14, a taper section 15, a secondary drive section 16, an orienting section 17 and a flex coupling 18.

FIGS. 2A and 2B illustrate the sections 12 through 18 in greater detail in the position assumed as the assembly 10 moves down through the tubing P. The primary driving section 11, which is conventional, is not illustrated in FIG. 2A. In operation, the drive sections 11 and 16 function as pistons which seal with the internal tubing wall so that a pressure differential may be developed across the pistons to move or "pump" the assembly through the tubing string P. The axial separation between the drive pistons permits the assembly to bridge wide spaces in the tubing line in which one of the pistons is not in sealing engagement with the tubing wall. A suitable seal means such as packing 16a is carried on the external surfaces of the sections 11 and 16 to provide a sliding pressure seal with the tubing wall. Since large hydraulic forces may be exerted on the drive sections 11 and 16, the use of packing in a seal bore is preferable to swab cup type seals.

The lower end of the drive piston 11 is connected by a ball head 19 to a socket formed at the upper end of the flex coupling 18 to form a joint 18a. A split lock ring 20 holds the ball head 19 in the socket. The ball and socket connection of the joint 18a permits flexing movement between the drive piston 11 and the coupling 18 while the lock ring 20 prevents the two components from separating. An access opening 21 extending through the coupling 18 into the upper socket is employed to insert the split ring 20 into the socket. An O-ring seal 19a of rubber or other suitable material is positioned between the ball and socket to provide a leak proof seal between the two components. The seal 19a also assists in maintaining a limied amount of rigidity in the joint to ensure proper operation of the assembly.

A similar pivot joint 18b is provided between the coupling 18 and the upper end of the orienting section 17. An alignment pin 22 extends from the ball head at the upper end of the orienting section into an enlarged bore 22a formed in the wall of the coupling 18 to prevent the section 17 from rotating relative to the coupling 18. The diameter of the bore 22a is large enough to permit ample bending between the components coupled at the joint 18b. An O-ring seal 22b is positioned between the ball and socket of the joint 18b.

Joints identical to the joint 18b are provided at 23, 24 and 25 to connect the various sections of the assembly 10 together. Similar joints 26 and 27 respectively secure the equipment handling or kickover section 14 to the lock sleeve section 13 and secure the lock sleeve section to the cam latch section 12.

Within the sections 12 and 13 is a safety lock rod LR′ formed of joined rod sections 28, 29, a coupling 30 and a lower rod section 31. Flexible ball and socket joints 32, 33 and 34 are provided between the rod sections and the coupling so that the safety lock rod LR′ is permitted to bend with the joints 26 and 27 as the assembly is moved through curved portions of the tubing. The joints 32–34 are equipped with split lock rings to hold the coupled assembly components together. A flexible, separable joint 35 is provided between the upper end of the rod section 28 and the lower end of a gas lift valve for a purpose to be described.

The assembly section 14 employed to handle the valve V is constructed with an upper sleeve section 14a and a lower section 14b connected together by pivot pins 36. The upper and lower sections are provided with cutaway wall sections to form openings 14c and 14d respectively. The lower opening 14d permits the lower end of the valve V to swing over the upper end of a landing recess R in the side pocket mandrel SP. The top portion of section 14a is tubular and houses a releasable valve securing mechanism indicated generally in 38. The mechanism 38, which holds the valve in the upper portion of the section 14a, includes resilient collet fingers 40 which are biased radially inwardly and extend downwardly from a collet head 41. Heads on the fingers 41 encircle and hold a ball 39 on the valve V. The mechanism 38 is releasably held to the section 14a by the heads on radially outwardly biased resilient collet fingers 42 which are engaged in a recess 42a. The collet fingers 42 extend upwardly from a collet connected to a central rod 44. A tubular cage 45 is secured to the rod 44 by a shear pin 46. Axially extending slots 47 formed in the wall of the cage 45 can be shifted downwardly to permit outward radial movement of the collet fingers 40 to release the valve V in a manner to be described.

VALVE PLACEMENT

Initially, the valve V is positioned in the handling section 14 and the assembly 10 is inserted into the tubing string T. Hydraulic pressure is then applied above the assembly 10 causing it to move through the tubing until the cam latch section 12 meets with a latch recess LR which has the same profile as spring loaded cam latches 12a carried on the section 12. When the section 12 meets the recess LR, springs 12b pivot the cam latches 12a outwardly into engagement with the latch recess. The lower ends of the cam latches 12a and of the recess LR are flat so that downward movement of the assembly 10 is prevented once the cams swing into the latch recess. The swinging out of the cam latches 12a releases a lower head 31a at the base of the rod section 31 from cam latch recesses 12c so that the safety lock rod LR' is freed for downward movement.

As the assembly 10 approaches the latching position, the orienting section 17 enters a guide section GS in the tubing string P. A contoured surface internally of the guide section GS cooperates with spring loaded vanes on the orienting section 17 to rotate the assembly so that it is in the position illustrated in FIGS. 2A and 2B when the cam latches 12a lock the assembly 10 in place. The operations of the orienting section 17 and guide section GS are more fully described in the parent application, U.S. patent application Ser. No. 243,380, issued on Mar. 26, 1974 as U.S. Pat. No. 3,799,259. It will be appreciated that even though separate segments or components have been shown for the orienting and latching or stopping devices, a single component suitably modified could be employed to perform both functions.

Figure 4:
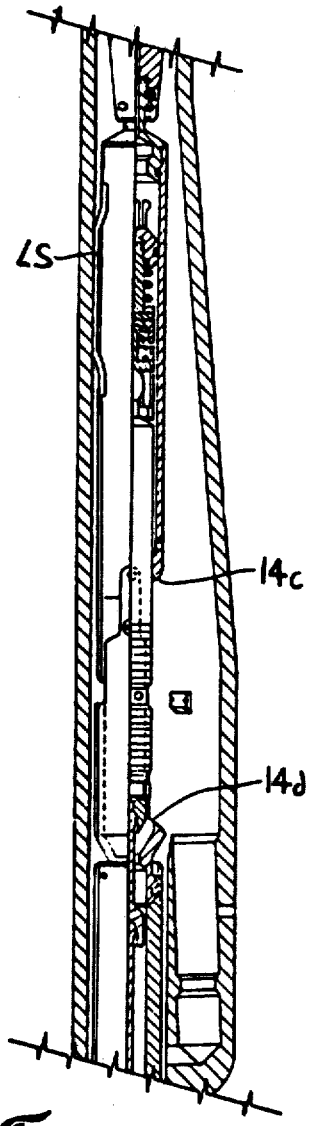
FIG. 4 is a vertical elevation in quarter section illustrating a portion of the running assembly of FIG. 2 landed in a side pocket mandrel.

In the landed, oriented position illustrated in FIGS. 2A and 2B, a leaf spring LS mounted on the section 14a biases the section toward the recess R. Once the assembly 10 is landed, pressure is applied through the tubing string P and a central flow passage 48 communicates the pressure through the upper end of the assembly 10 to an O-ring seal 49 which encircles the collet head 43. The seal 49 cooperates with the head 43 to form a pressure responsive control piston. The pressure applied to the top of the head 43 tends to force the mechanism 38 downwardly through the section 14a. The section 14a is prevented from moving downwardly by the latch section 12. When sufficient pressure forces are developed against the mechanism 38, the heads of the collet fingers 42 move radially inwardly and release the annular groove 42a permitting the mechanism to shift downwardly through section 14a as illustrated in FIG. 4. The downward movement of the mechanism 38 pushes the valve V downwardly which in turn pushes the safety lock rod LR' downwardly. Downward movement of the lock rod LR' continues until a split ring 51 carried by the collar 30 registers with an annular recess 52 formed internally of the upper end of the latching section 12. When this occurs, the lock ring 51 is permitted to open radially into the recess to prevent subsequent upward or downward movement of the lock rod. When the internal joints 32, 33 and 34 of the lock rod LR' are shifted downwardly, the joints 24 and 33 are aligned so that the section 13 and latch section 12 may bend relative to each other. Sufficient clearance is provided between the down shifted central lock rod assembly LR' and the surrounding cam latch section 12, sleeve section 13 and handling section 14b to permit ample bending of the assembly 10 during the return trip to the surface.

The rod head 31a is shifted below the cam latch section 12 into the position shown by dotted line in FIG. 2B to permit subsequent retraction of the cam latches 12a. If desired, the safety lock rod may be replaced by any suitable flexible means capable of preventing movement of the valve toward the side pocket recess R until after the cam latch 12 has been properly landed in the recess LR. For example, a self erecting length of flexible metal or other material may be employed.

The pressure being supplied through the tubing string P is terminated when the safety lock rod LR' has been shifted to its lower position and a reverse pressure is then supplied to the annular area A between the tubing string and the surrounding casing string. The annulus pressure is communicated to the tubing string at a point below the position of the assembly 10 by any suitable or conventional means. The reverse pressure acts against the lower end of the O-ring seal 49 driving the mechanism 38 back upwardly through the section 14a. The pressure applied below seal 49 is controlled so that it is sufficient to drive the mechanism 38 and attached valve V upwardly through the kickover section 14 but is not strong enough to cause the cam latches 12a to retract and release the assembly 10.

Figures 3, 6, 7:
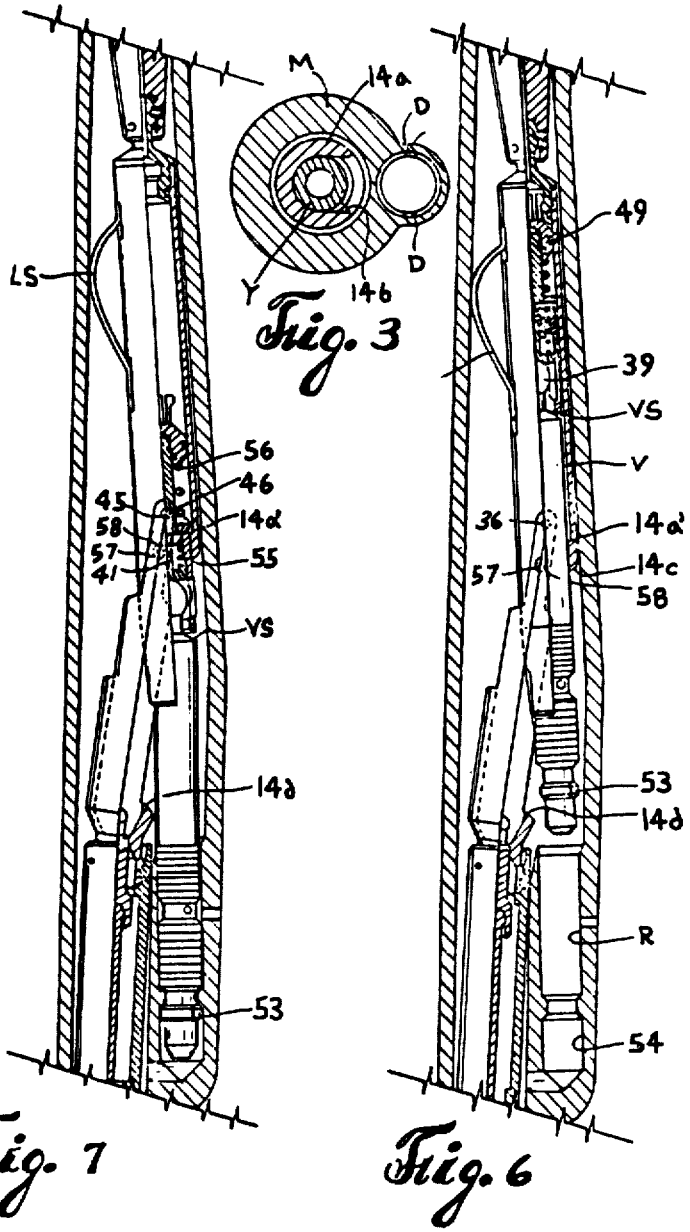
FIG. 3 is a horizontal cross section taken along the line 3—3 of FIG. 2.
FIG. 6 is a view similar to FIG. 5 illustrating the assembly kicked over and the gas lift valve being inserted into the mandrel side pocket.
FIG. 7 is a view similar to FIG. 6 illustrating the assembly releasing the landed gas lift valve.
Figure 5:
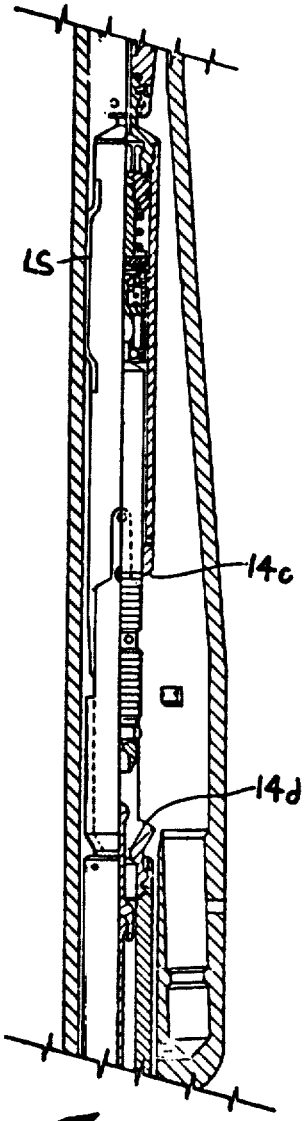
FIG. 5 is a view similar to FIG. 4 illustrating the assembly of the invention just prior to kicking over into position for landing a valve in a mandrel side pocket.

When the mechanism 38 is at the upper position in the kickover section 14, illustrated in FIG. 5, the bottom of the valve V is separated from the rod section 29 and the leaf spring LS jack-knifes the assembly into the position illustrated in FIG. 6. The tapered configuration of section 15 permits the upper section 14a to move against the inclined wall above the recess R. The direction of pressure application is again reversed and a downward force is exerted against the top of the assembly 10 and seal 49. An initial downward movement is produced in the upper portion of the assembly 10 causing the lower edge of section 14a to move against stops D in the mandrel SP which prevent additional force from being exerted on the cam latch 12. If desired, the spring LS may be eliminated and the initial effect of the downward force acting against the upper end of assembly 10 may be employed to cause the jack-knifing action. To this end, the pivot axis of pin 36 is offset with respect to the longitudinal axis of the assembly so that a bending action occurs as the top of the assembly 10 moves downwardly.

With the section 14a in the position illustrated in FIG. 6, the continued application of pressure from above the assembly 10 acts against the mechanism 38 causing the heads of the collet fingers 42 to release the groove 42a so that the mechanism and attached valve V move downwardly through the section 14a. When the valve position illustrated in FIG. 7 is reached, a split snap ring 53 carried by the valve V springs radially outwardly into an enlarged recess 54 to hold the valve V in place within the landing recess R. A port 14a' limits the lower travel of the pressure responsive movement of the mechanism 38 through the section 14a. In its landed position, the gas lift valve V functions in a conventional manner to control the flow of gas through a mandrel opening GP extending between the tubing string P and the annulus A.

After the valve V has been properly landed, the pressure acting downwardly on the collet head 43 compresses a small coil spring 55 permitting the base of the cage 45 to engage a shoulder VS on the valve V. Subsequent downward movement of the cage 45 is then prevented and continued downward movement of the collet head 43 severs the shear pin 46. When pressure on the assembly 38 is relieved, a heavier coil spring 56 overcomes the force of spring 55 and shifts the cage 45 downwardly with respect to the collet fingers 40 so that the heads on the fingers are free to move radially outwardly through the cage slots 47. Pressure is then applied upwardly through the section 14a. The ball head 39 at the upper end of the valve V is released by the collet fingers 40 as the fingers spread radially outwardly into the openings 47.

When sufficient hydraulic pressure is developed below the assembly 10, the cam latches 12a are forced radially inwardly by sliding tapered surfaces acting between the cam latches 12a and the upper shoulders on the latch recess LR. Once the cam latches 12a have retracted radially, the assembly 10 may be pumped to the surface.

RETRIEVAL OF LANDED EQUIPMENT

When employed to retrieve the valves from landed position, the assembly 10 is substantially as it appears in FIGS. 1 and 2A, 2B, with the valve V and the lock rod LR' omitted. For the retrieval operation, a threaded shear pin 57 extending through the lower section 14b is advanced into engagement with a bore 58 in the upper kickover section 14a to prevent pivotable motion between the upper and lower components until the assembly 10 has landed in the mandrel. The mechanism 38 is also latched in the recess 42a and an unsevered shear pin 46 is employed for the retrieval or pulling operation.

The assembly as adapted for retrieving is inserted into the tubing T at the surface and pumped to the subsurface location where it stops when the cam latches 12a spring into the latch recess LR. Subsequent application of pressure from above the assembly 10 severs the shear pin 57 causing the assembly to jack-knife into the position illustrated in FIG. 7. The pressure required to sever the pin 57 is not high enough to cause the mechanism 38 to release its engagement with the groove 42a. The opening 14c permits the upper section 14a to move into position over the top of the valve V during the jack-knife movement.

After the assembly has jack-knifed, continued application of tubing pressure from the surface releases the fingers 42 from the groove 42a and forces the mechanism 38 downwardly through the section 14a. When the base of the collet fingers 40 engage the ball head 39, the collet head 41 is pushed upwardly through the assembly 38 against the restraining force of the spring 55. Upward motion of the head 41 within the surrounding cage 45 permits the fingers 40 to spring radially outwardly through the slots 47 to slip over the head 39. Once the fingers 40 of assembly 38 have thus latched over the valve V, a reversal of fluid pressure forces the mechanism 38 upwardly through the section 14a. Lower tapered surfaces on the collet fingers 40 engage the tapered surfaces at the base of the cage 45 causing the heads on the fingers to be urged inwardly as the assembly 38 exerts a lifting force on the valve V. This in turn prevents the collet fingers 40 from releasing the valve V. The split ring 53 at the lower end of the valve V is urged radially inwardly by the tapering surfaces between the ring and the mandrel recess R causing the ring to compress and freeing the valve from the recess. Continued application of pressure then releases the cam latch 12 and permits the assembly and retrieved valve V to be removed to the surface. If the valve V will not release from the recess R, the pin 46 may be sheared by applying a sufficiently large pressure above the assembly as described previously and the assembly 10 may be retrieved without the valve so that other equipment can be employed in the retrieval effort.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. A segmented assembly for handling well equipment of the type which is movable through a tubing string for longitudinal engagement with [a] *an open-topped* side pocket recess of a side pocket mandrel comprising:

a. pressure actuated drive means connected with said assembly for driving said assembly through said tubing string in response to pressure applied to said drive means;

b. well equipment handling means connected in said assembly for handling and holding said well equipment;

c. position responsive stopping means in said assembly *operable during downward movement of said assembly in the tubing string* for automatically stopping said assembly at a predetermined location relative to a selected side pocket recess, *said stopping means including outwardly biased latch means having a profile designed to mate with and engage recess means in the tubing string below said selected side pocket recess to thereby automatically terminate said downward movement, said recess means having the same profile as the profile of said latch means*;

d. orienting means in said assembly for circumferentially orienting said assembly at a predetermined position relative to said side pocket recess; and e. flexible joint means connecting one end of said handling means to said stopping means and the other end of said handling means to said orienting means whereby said assembly may flex to move through curved [sect-ons] *sections* of said tubing string.

2. An assembly as defined in claim 1 wherein said handling means includes landing means for carrying well equipment through the tubing string and landing and then releasing said well equipment in a side pocket recess.

3. An assembly as defined in claim 1 wherein said handling means includes retrieving means for attaching to well equipment landed in a side pocket recess and withdrawing said attached equipment as said assembly is moved through the tubing string.

4. An assembly as defined in claim 2 wherein said handling means includes retrieving means for attaching to well equipment landed in a side pocket recess and withdrawing said attached equipment as said assembly is moved through the tubing string.

5. An assembly as defined in claim 2 further including safety lock means preventing relative longitudinal movement of components of said handling means and preventing release of said well equipment by said handling means until said assembly is stopped at said predetermined location.

6. An assembly as defined in claim 5 wherein:

a. said safety lock means includes a self erecting, bendable support means held in a first position on said assembly by said stopping means until said predetermined location is reached;

b. said support means is movable after reaching said predetermined location to a second position on said assembly; and c. flexible means are included in said support means for permitting said support means and said assembly to flex when said support means is at said first or second positions.

7. An assembly as defined in claim 1 wherein:

a. said stopping means includes spring loaded latch means biased radially outwardly from said assembly and adapted to spring outwardly into a tubing string locating recess having a predetermined configuration for stopping axial movement of said assembly; and b. said orienting means includes inclined guiding surfaces on said assembly adapted to engage and slide against inclined guiding surfaces carried by said tubing string for rotating said assembly, prior to reaching said predetermined location, into a predetermined position relative to the opening in said selected side pocket recess.

8. An assembly as defined in claim 6 wherein:

a. said stopping means includes spring loaded latch means biased radially outwardly from said assembly and adapted to spring outwardly into a tubing string locating recess having a predetermined configuration for stopping axial movement of said assembly; and b. said orienting means includes inclined guiding surfaces on said assembly adapted to engage and slide against inclined guiding surfaces carried by said tubing string for rotating said assembly, prior to reaching said predetermined location, into a predetermined position relative to the opening in said selected side pocket recess.

9. An assembly as defined in claim 2 wherein said handling means includes relatively movable components operable by pressure acting in said tubing to move said well equipment from an initial position in said assembly to a second position wherein the bottom of said equipment is positioned over the opening of a selected side pocket recess, said components including a releasable holding mechanism operable by pressure acting in said tubing to land said well equipment in said selected side pocket recess.

10. A segmented assembly for handling well equipment of the type which is movable through a tubing string for use in the side pocket recess of a side pocket mandrel comprising:

a. pressure actuated drive means connected with said assembly for driving said assembly through said tubing string in response to pressure applied to said drive means;

b. well equipment handling means connected in said assembly for handling and holding said well equipment;

c. position responsive stopping means in said assembly for stopping said assembly at a predetermined location relative to a selected side pocket recess;

d. orienting means in said assembly for circumferentially orienting said assembly at a predetermined position relative to said side pocket recess;

e. flexible joint means connecting at least two adjacent segments in said segmented assembly wherein said assembly may flex to move through curved sections of said tubing string;

f. landing means included in said handling means for carrying well equipment through the tubing string and landing and then releasing said well equipment in a side pocket recess;

g. said equipment handling means further including first and second sleeve sections secured together by a pivotable connection whereby said first and second sleeve sections are movable in a jack-knife motion to position said first sleeve section over said selected recess;

h. said first sleeve section including a bore in fluid communication with the pressure in said tubing string; and i. said equipment handling means including a releasable holding means and a piston slidable through said bore under the influence of pressure in said tubing string to eject said well equipment from said first sleeve section and to release said equipment after it is landed in said selected recess.

11. An assembly as defined in claim 10 wherein the axis of said pivotal connection is eccentrically disposed with respect to the longitudinal axis of said assembly whereby compressive force exerted from one end of said assembly causes said first and second sleeve section to pivot about said pivotal connection.

12. An assembly as defined in claim 1 wherein said drive means, said stopping means, said equipment handling means and said orienting means are each separate segments having flexible joint means provided between adjacent segments whereby said assembly may flex as it moves through curved sections of tubing.

13. An assembly as defined in claim 9 wherein said releasable holding mechanism includes:

a. first releasable and subsequently reengageable means for holding said mechanism at a first position in a first sleeve section of said handling means; and b. a piston section is included in said mechanism responsive to pressure from above said piston section to move said mechanism downwardly from said first position in said sleeve section to a second lower sleeve position and responsive to pressure from below said piston section to move said mechanism back toward said first sleeve position.

14. An assembly as defined in claim 4 wherein said handling means includes relatively movable components operable by pressure acting in said tubing to move said well equipment from an initial position in said assembly to a second position wherein the bottom of said equipment is positioned over the opening of a selected side pocket recess, said components including a releasable holding mechanism operable by pressure acting in said tubing to land said well equipment in said selected side pocket recess.

15. An assembly as defined in claim 14 wherein said mechanism includes pressure actuated means for engaging and holding well equipment landed in said selected recess.

16. A segmented running tool for through-the-flowline retrieval or placement of gas lift valves designed for use in [the] *an open-topped* landing recess of a selected side pocket mandrel comprising:

a. pressure drive means responsive to pressure in the flowline to move said tool between the flowline surface and the selected side pocket mandrel;

b. location responsive stopping means connected with said drive means *and operable during downward movement in the flowline* for stopping longitudinal tool movement through the flowline at a predetermined location relative to the landing recess in the selected side pocket mandrel, *said stopping means including outwardly biased latch means having a profile designed to mate with and engage recess means in the flowline below said open-topped landing recess in said selected side pocket mandrel to thereby automatically terminate said downward movement, said recess means and latch means having matching profiles*;

orienting means connected with said drive means and said stopping means for orienting at least a portion of said assembly at a predetermined position relative to said landing recess;

d. valve handling means connected with said drive means, stopping means and orienting means for holding a gas lift valve in said assembly as it is moved through said flowline;

e. kickover means included in said handling means for moving a portion of said handling means laterally away from the assembly toward said landing recess;

f. holding means included in said handling means for moving said valve longitudinally relative to said landing recess; and g. flexible connecting means connecting said drive means, stopping means, orienting means and handling means into said assembly whereby said assembly may flex along its length as required for movement through curved sections of the flowline.

17. An assembly as defined in claim 16 wherein:

a. said handling means includes release means for landing said valve in said recess; and b. said holding means includes release means for releasing said valve from said assembly following landing of said valve in said recess.

18. An assembly as defined in claim 16 wherein said holding means includes attachment means for attaching to said valve while said valve is in landed position whereby said valve may be retrieved at the flowline surface.

19. An assembly as defined in claim 16 wherein said flexible connecting means include means for preventing relative [pivotal] *rotational* movement between connected segments while permitting relative [pivoted] *pivotal* movement between said segments.

20. An assembly as defined in claim 17 further including safety lock means connected with said stopping means for preventing release of said valve until said assembly is stopped by said stopping means.

21. An assembly as defined in claim 16 further including safety lock means for preventing said valve movement relative to said recess until said assembly is stopped by said stopping means.

22. An assembly as defined in claim 18 wherein said attachment means further includes pressure responsive emergency release means for permitting said attachment means to release from said valve.

* * * * *

UNITED STATES PATENT AND TRADEMARK OFFICE

CERTIFICATE OF CORRECTION

PATENT NO. : Re 31,155

DATED : February 22, 1983

INVENTOR(S) : Robert W. Dinning

It is certified that error appears in the above-identified patent and that said Letters Patent is hereby corrected as shown below:

On the title page, the name of the inventor "Samuel S. Crocker, Houston, Tex." should read --Robert W. Dinning, Houston, Tex.--.

Signed and Sealed this

*Thirtieth* Day of *April 1985*

[SEAL]

*Attest:*

DONALD J. QUIGG

*Attesting Officer*

*Acting Commissioner of Patents and Trademarks*